Figures 1A, 1B:
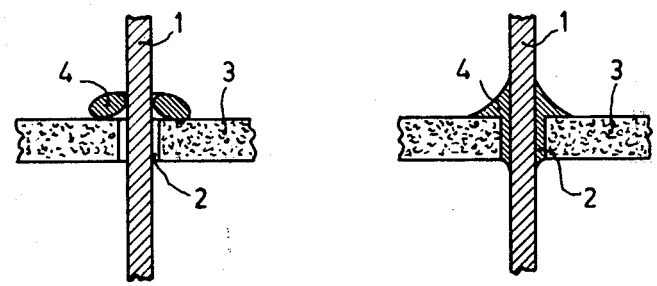

United States Patent [19]

Monneraye et al.

[11] 4,163,656
[45] Aug. 7, 1979

[54] METHOD OF MANUFACTURING A LEAD-THROUGH OF A METAL ELEMENT THROUGH A CERAMIC COMPONENT BY MEANS OF SEALING

[75] Inventors: Marc A. Monneraye, Aubervilliers; Michel J. C. Monnier, Montgeron, both of France

[73] Assignee: U.S. Philips Corporation, New York, N.Y.

[21] Appl. No.: 370,400

[22] Filed: Jun. 15, 1973

[30] Foreign Application Priority Data

Jun. 21, 1972 [FR] France ............................... 72.22323

[51] Int. Cl.² .......................................... C03C 27/04
[52] U.S. Cl. ...................................... 65/43; 65/59 R; 106/54
[58] Field of Search ...................... 65/43, 59; 106/54

[56] References Cited

U.S. PATENT DOCUMENTS 3,220,815   11/1965   McMillan et al. ....................... 65/43

FOREIGN PATENT DOCUMENTS 1205652   9/1970   United Kingdom ......................... 65/43

*Primary Examiner*—Arthur D. Kellogg
*Attorney, Agent, or Firm*—Robert S. Smith

[57] ABSTRACT

A method for manufacturing a lead-through of a metal element consisting of a fernico alloy through a component of ceramic material. A suspension is supplied of glass powder having molar percentage compositions within defined limits. The suspension is deposited on the ceramic material at the area of the lead-through and the assembly is heated for several minutes in an nitrogen atmosphere at a temperature near 1000° C. followed by cooling of the assembly to room temperature.

3 Claims, 3 Drawing Figures

METHOD OF MANUFACTURING A LEAD-THROUGH OF A METAL ELEMENT THROUGH A CERAMIC COMPONENT BY MEANS OF SEALING

The present invention relates to a method of manufacturing a lead-through of a metal element through a ceramic component by means of sealing. The metal element may be an alloy of iron, nickel, cobalt—known under the name of Fernico (commercially Dilver P. Vacon 12, Nilo K etc.).

Such seals are necessary particularly for manufacturing conducting lead-throughs, which are gas tight and vacuum tight, through ceramic materials such as aluminium oxide or beryllium oxide and which may be used, for example, for the manufacture of connections through a substrate having an output circuit of a housing accommodating semiconductor elements, output electrodes, high voltage arrangements, connections to the electrodes of photomultiplier tubes having a ceramic structure, etc.

The problem of manufacturing conducting lead-throughs by means of sealing, which has been elaborately studied in literature, makes an investigation necessary for each type of material used, both for the conductor and for the ceramic part so that a suitable sealing material can be chosen.

As regards the seals for Fernico conductors through glass components, glass types have been proposed whose coefficient of expansion is exactly the same as that of Fernico with the annealing point of glass coinciding with the Curie point of Fernico; since these glass types belong to the category of so-called long glasses, that is to say, the viscosity remains high in a broad temperature range, they cannot be used for sealing in a ceramic component. In fact, Fernico cannot be heated to a temperature of more than 1100° C. without jeopardizing its mechanical properties and at this temperature the viscosity of the long glass types is found to be too high to make it possible to fill up the capillary space between the ceramic material and the metal.

U.S. Pat. No. 3,113,878 proposes a sealing material of metal on ceramic material which consists of devitrifiable glass types which belong to the category of short glasses—whose viscosity quickly decreases with the temperature at a comparatively low quartz content. These compositions have, however, a high ZnO content (more than 60%) so that the range of the coefficient of expansion is comparatively narrow and is not suitable for Fernico.

U.K. Pat. No. 1,251,904 proposes different glasses of the short type, likewise based on zinc-borosilicates, which widen the field of application of these compositions and which have eminent adherent properties for metal and ceramic material. Unfortunately the annealing points (AP) of these glass types are too high to make sealing of fernico lead-throughs in ceramic material possible. In fact, the temperature at which the melting glass adheres to the metal may be made equal to the annealing point and this point must approach the Curie point of fernico as much as possible (approximately 440° C.).

The present invention proposes a method of sealing with the aid of a glass of the short type based on zinc-borosilicates, which may be particularly used for sealing fernico lead-throughs in a ceramic substrate.

According to the invention a suspension of glass powder based on zinc-borosilicate which also comprises lithium oxide in a molar quantity of from 3 to 5% is deposited on the substrate at the area of the lead-through whereafter the assembly is heated for several minutes in a nitrogen atmosphere at a temperature near 1000° C. and is cooled to room temperature.

In the method according to the invention the product is to be maintained preferably during cooling at the value of the annealing point (AP) of the glass for at least 15 minutes so that the sealing operation can be controlled.

The use as a sealing material of glasses of the short type based on zinc-borosilicates including lithium oxide has been proposed in the U.K. Pat. application No. 60,314/71 in the name of the Applicant and it relates to sealing two ceramic materials together or sealing a metal to a ceramic material. The material was, however, examined with a view to enveloping hybrid circuits (generally of gold) provided on a ceramic substrate in a ceramic envelope. The content of lithium oxide was chosen with a view to two contradictory requirements: a high content in order that the temperature at which sealing is performed is lower than 800°. and a low content in order that the material retains its satisfactory electrical insulation.

The molar quantity of lithium oxide was between 5 and 10% and preferably near 10%. The coefficients of expansion of the glasses thus obtained are generally higher than 60 which value is to be ascribed to the presence of alkaline earth oxide with the result that they are not adapted to that of fernico.

On the other hand the materials proposed therefor are derived from zinc-borosilicate by addition of the minimum quantity of lithium oxide, which is necessary to bring their curve of expansion in conformity with that of fernico.

In addition an improvement of the adhesion of the seal may be obtained by adding small quantities of aluminium oxide (less than 6%). In order to exert a slight pressure on the glass in its longitudinal direction relative to the fernico lead-through, (which, as is known from experience, is very favourable for the mechanical behaviour of the seal) the coefficient of expansion of the said materials will never be more than $51.10^{-7}$° $C.^{-1}$ (lower than the coefficient of expansion of fernico at the sealing temperature).

The invention will hereinafter be described in detail with reference to some examples and the accompanying drawings in which FIGS. 1a and 1b show two stages of manufacturing a fernico lead-through through a ceramic substrate by means of sealing.

Figure 2:
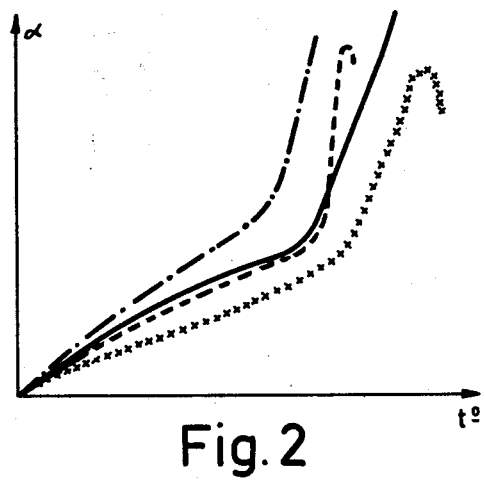

FIG. 2 shows curves of expansion of fernico of a short glass based on zinc-borosilicate, of the same glass after addition of lithium oxide so as to adapt it to the ceramic material-fernico seal and of a glass which in addition comprises a larger quantity of lithium oxide and is not adapted to fernico.

FIG. 1a shows a metal element 1 referred to as the lead-through of a fernico alloy through an aperture 2 of a ceramic component 3 (for example, in aluminium oxide or beryllium oxide).

The difference between the respective diameters of the apertures and of the metal elements does not exceed 0.15 mm (0.10 to 0.05 mm). A quantity of glass powder having a suitable composition chosen from the range given below and including in suspension a small quantity of lithium oxide in an organic liquid is provided at the area of the aperture 2 and around the lead-through 1, for example, with the aid of a brush. The "bead" of glass power thus obtained is denoted by 4.

The assembly is heated for 10 minutes at approximately 1000° C. in a furnace through which a hydrogen-nitrogen stream saturated with water vapour is passed at room temperature. The molten glass wets the ceramic material and the metal lead-through and fills up the free space in the aperture 2 by capillary action. After cooling a lead-through 1 as shown in FIG. 1b sealed in the ceramic material is obtained. In order to control the sealing operation the product is maintained at the value of the annealing point of the glass (AP) preferably during cooling for 15 to 30 minutes.

Table 1 shows different compositions based on zinc-borosilicate comprising lithium oxide in quantities which are less than or equal to 5%.

This table likewise shows for each composition the coefficient of expansion $\alpha$ measured between 20° and 300° C., the annealing point (AP) and the density $\rho$.

TABLE I.

| mol. compositions | 1 | 2 | 3 | 4 | 5 | 6 | 7 | 8 | 9 |
|---|---|---|---|---|---|---|---|---|---|
| $SiO_2$ | 5 | 10 | 15 | 20 | 5 | 10 | 15 | 20 | 25 |
| $B_2O_3$ | 35 | 30 | 26.5 | 20 | 40 | 35 | 30 | 25 | 20 |
| ZnO | 56 | 55 | 55 | 55 | 50 | 51.5 | 50 | 50 | 50 |
| $Li_2O$ | 4 | 5 | 3.5 | 5 | 5 | 3.5 | 5 | 5 | 5 |
| $Al_2O_3$ | 0 | 0 | 0 | 0 | 0 | 0 | 0 | 0 | 0 |
| $\alpha\ 10^{-7}.°C.^{-1}$ | 49.5 | 49.5 | 49.5 | 49 | 51 | 50 | 49 | 47.5 | 47 |
| (°C.) | (kg . m$^{505}$ | 520 | 515 | 515 | 520 | 510 | 520 | 520 | |
| $\rho$ (kg . m$^{-3}$) | 3630 | 3600 | 3650 | 3695 | 3420 | 3510 | 3570 | 3530 | 3560 |
| mol. compositions | 10 | 11 | 12 | 13 | 14 | 15 | 16 | 17 | |
| $SiO_2$ | 5 | 10 | 15 | 5 | 10 | 15 | 20 | 5 | |
| $B_2O_3$ | 45 | 40 | 35 | 50 | 45 | 30 | 25 | 55 | |
| ZnO | 45 | 45 | 45 | 40 | 40 | 45 | 45 | 35 | |
| $Li_2O$ | 5 | 5 | 5 | 5 | 5 | 5 | 5 | 5 | |
| $Al_2O_3$ | 0 | 0 | 0 | 0 | 0 | 5 | 5 | 0 | |
| $\alpha\ 10^{-7}.°C.^{-1}$ | 49.5 | 49.5 | 49.5 | 51 | 47.5 | 48 | 49 | 49.5 | |
| (°C.) | 520 | 520 | 520 | 535 | 520 | 515 | 520 | 535 | |
| $\rho$ (kg .m$^{-3}$) | 3290 | 3340 | 3340 | 3150 | 3170 | 3400 | 3320 | 2995 | |

In the examples mentioned above it is to be noted that the $SiO_2$ content is limited to 25 mol.% so as to limit the devitrification of the material which might result in an increase of the sealing temperature.

FIG. 2 shows by way of comparison the curves of expansion as a function of the temperature:
 fernico: in solid lines
 a short glass based on zinc-borosilicate without $Li_2O$: in cross lines
 the composition 17 of table 1: in broken lines
 a composition comprising $Li_2O$ described in the application mentioned in the preamble: in chainlink lines.

To check the adhesion of glass types containing $Li_2O$ adapted to fernico, aluminum oxide rings having a diameter of 4 mm were sealed to fernico rings of the same diameter. The seals thus obtained were subjected to bending tests until breakage, which occurred particularly in aluminium oxide.

Table II shows given compositions and their properties, the sealing temperatures and the breakage percentages.

TABLE II.

| mol. compositions | 4 | 7 | 9 | 10 | 15 |
|---|---|---|---|---|---|
| $SiO_2$ | 20 | 15 | 25 | 5 | 15 |
| $B_2O_3$ | 20 | 30 | 20 | 45 | 30 |
| $Li_2O$ | 5 | 5 | 5 | 5 | 5 |
| ZnO | 55 | 50 | 50 | 45 | 45 |
| $Al_2O_3$ | 0 | 0 | 0 | 0 | 5 |
| $\alpha\ 10^{-7}°C.^{-1}$ | 49 | 49 | 47 | 49.5 | 48 |
| AP (°C.) | 515 | 510 | 520 | 520 | 515 |
| Sealing temperature (°C.) | 1100 | 950 | 1050 | 950 | 950 |
| breaking strength (dica newton. mm$^{-2}$) | 16.6 | 20.8 | 16.0 | 19.2 | 22.0 |
| percentage of breakage in the ceramic material | | 60% | 20% | 40% | 60% |

What is claimed is:

1. A method of manufacturing a lead-through of a metal element consisting of a fernico alloy through a component of ceramic material by means of sealing with the aid of a glass type based on zinc-borosilicate, comprising supplying a suspension of glass powder whose molar quantity percentage composition is between the following limits
 $SiO_2$:4–26
 $B_2O_3$:19–56
 ZnO:29–57
 $Li_2O$:3.0–5.0
 $Al_2O_3$:0–6
depositing said suspension on the ceramic material at the area of the lead-through, heating the assembly for several minutes in a nitrogen atmosphere at a temperature near 1000° C. and cooling the assembly to room temperature.

2. A method as claimed in claim 1, wherein said suspension of glass powder has $SiO_2$ content between 5 and 20 mol%.

3. A method as claimed in claim 2, wherein said cooling step further includes first maintaining the product at the value of the annealing point of the glass for at least 15 minutes.

* * * * *